United States Patent
Bardalai et al.

(10) Patent No.: US 6,515,966 B1
(45) Date of Patent: Feb. 4, 2003

(54) SYSTEM AND METHOD FOR APPLICATION OBJECT TRANSPORT

(75) Inventors: Snigdho C. Bardalai, Plano, TX (US); Abed M. Jaber, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 233 days.

(21) Appl. No.: 09/588,637

(22) Filed: Jun. 6, 2000

Related U.S. Application Data (60) Provisional application No. 60/202,190, filed on May 5, 2000.

(51) Int. Cl.[7] .............................................. H04L 12/26
(52) U.S. Cl. ...................................................... 370/236
(58) Field of Search ................................ 370/360, 384, 370/395.21, 395.3, 395.31, 395.32, 400, 410, 229, 235, 236, 252, 230, 230.1, 231, 389; 709/227, 228, 229, 232, 234

(56) References Cited

U.S. PATENT DOCUMENTS

| | | | |
|---|---|---|---|
| 5,229,990 A | 7/1993 | Teraslinna | 370/60 |
| 5,231,633 A | 7/1993 | Hluchyj et al. | 370/94.1 |
| 5,461,624 A | 10/1995 | Mazzola | 370/85.13 |
| 5,771,370 A | 6/1998 | Klein | 395/500 |
| 5,818,842 A | 10/1998 | Burwell et al. | 370/397 |
| 5,825,772 A | 10/1998 | Dobbins et al. | 370/396 |
| 5,850,399 A | 12/1998 | Ganmukhi et al. | 370/412 |
| 5,852,606 A | 12/1998 | Prince et al. | 370/393 |
| 5,946,308 A | 8/1999 | Dobbins et al. | 370/392 |
| 5,956,341 A | 9/1999 | Galand et al. | 370/412 |
| 6,018,766 A | 1/2000 | Samuel et al. | 709/218 |
| 6,028,842 A | 2/2000 | Chapman et al. | 370/235 |
| 6,058,113 A * | 5/2000 | Chang | 370/236 |
| 6,075,767 A | 6/2000 | Sakamoto et al. | 370/228 |
| 6,205,158 B1 | 3/2001 | Martin et al. | 370/541 |
| 6,317,426 B1 | 11/2001 | Afanador et al. | 370/352 |
| 6,331,905 B1 | 12/2001 | Ellinas et al. | 359/110 |
| 6,353,593 B1 | 3/2002 | Chen et al. | 370/216 |
| 6,353,616 B1 * | 3/2002 | Elwalid et al. | 370/389 |
| 6,359,857 B1 | 3/2002 | Ahmad et al. | 370/217 |
| 2001/0025310 A1 * | 9/2001 | Krishnamurthy et al. | 709/223 |

FOREIGN PATENT DOCUMENTS

| | | | |
|---|---|---|---|
| EP | 0 512 495 A2 | 11/1992 | H04L/12/56 |
| EP | 0 849 970 A2 | 6/1998 | H04Q/11/04 |
| EP | 0 959 641 A1 | 11/1999 | H04Q/11/04 |
| WO | WO 97/40610 | 10/1997 | H04L/29/06 |
| WO | WO 98/00954 | 1/1998 | H04L/29/06 |
| WO | WO 99/11090 | 3/1999 | H04Q/11/04 |
| WO | WO 99/66675 | 12/1999 | H04L/12/46 |
| WO | WO 00/10357 | 2/2000 | H04Q/7/38 |
| WO | WO 00/21254 | 4/2000 | H04L/12/56 |
| WO | WO 00/24164 | 4/2000 | H04L/12/56 |

OTHER PUBLICATIONS

PCT International Search Report No. PCT/US01/13724, dated Nov. 30, 2001, 6 pages.

(List continued on next page.)

*Primary Examiner*—Kwang Bin Yao
(74) *Attorney, Agent, or Firm*—Baker Botts L.L.P.

(57) ABSTRACT

A method of facilitating traffic engineering services by communicating application objects over soft state process messages includes receiving an external soft state process initiating message at an ingress node to a core cloud, the core cloud comprising a plurality of nodes associated with a central processor, and generating an internal soft state process initiating message including an appended first application object. The method further includes communicating the internal soft state process initiating message to an egress node of the core cloud, receiving at the ingress node an internal soft state process confirming message including an appended second application object, and providing a traffic engineering service based, at least in part, on the first or second application data.

39 Claims, 4 Drawing Sheets

OTHER PUBLICATIONS

Birman A et al.: "Support for RSVP–Based Services Over ATM Networks," Communications: The Key to Global Prosperity. Globecom 1996. Global Internet 96 Conference Record. London, Nov. 18–22, 1996, Global Telecommunications Conference (Globecom, New York, IEEE, US, vol. SUPP, Nov. 18, 1996 pp. 10–15, XP000741665 ISBN: 0–7803–3337–3.

Sharma et al.: "Scalable timers for soft state protocols," Infocom '97. Sixteenth Annual Joint Conference of the IEEE Computer and Communications Societies. Driving the Information Revolution., Proceedings IEEE Kobe, Japan Apr. 7–11, 1997, Los Alamitos, CA USA, IEEE Comptu. Soc, US Apr. 7, 1997, pp. 222–229, XP010252006, ISBN: 0–8186–7780–5.

International Search Report in International Application No. PCT/US01/14626, dated Feb. 5, 2002, 7 pages.

International Search Report in International Application No. PCT/US01/14622, dated Feb. 14, 2002, 7 pages.

Pancha P: "ATM Switch Routers for Combined Connection–Oriented and Connectionless Transport," ISS '97. World Telecommunications Congress. (Int'l Switching Symposium). Global Network Evolution: Convergence or Collision? Toronto, Sep. 21–26, 1997, ISS. World Telecommunications Congress. (International Switching Symposium).

Mysore J. P. et al.: "Performance of transport protocols over a multicasting–based architecture fr Internet host mobility" Communications, 1998. ICC 98. Conference Record. 1998 IEEE International Conference on Atlanta, GA, USA Jun. 7–11, 1998, New York, NY USA, IEEE, US, Jun. 7, 1998, pp. 1817–1823, XP010284635, ISBN: 0–7803–4788–9.

Bar–Noy A. et al.: "Topology Distribution Cost Vs. Efficient Routing in Large Networks," Computer Communications Review, Association for Computing Machinery, New York, US, vol. 20, No. 4, Sep. 1, 1990, pp. 242–252, XP000168058; ISSN: 0146–4833, whole document.

International Search Report in International Application No. PCT/US01/13694, dated Mar. 12, 2002, 7 pgs.

Fritz J: "Bullet Proofing ATM: Part I," Byte, McGraw–Hill Inc. St. Peterborough, US, vol. 22, No. 6, Jun. 1, 1997, pp. 59–60, XP000691556, ISSN: 0360–5280, p. 60.

Sun H. et al.: "Supporting IP on the ATM networks: an overview," Computer Communications, Elsevier Science Publishers BV, Amsterdam, NL, vol. 21, No. 11, Aug. 10, 1998, pp. 1020–1029, XP004138773, ISSN: 0140–3664, whole document.

Law A M et al: "Simulation Software for Communications Networks: The State of the Art," IEEE Communications Magazine, IEEE Services Center. Piscataway, N.J., US, vol. 32, No. 3, Mar. 1, 1994, p. 1, column 2, line 4–p. 2, column 1, line 39, p. 4, column 1, line 3–p. 6, column 1, paragraph 6; XP 000442186.

International Search Report in International Application No. PCT/US01/14615, dated Apr. 5, 2002, 7 pages.

International Preliminary Examination Report in International Application No. PCT/US01/13725, dated Jun. 4, 2002, 5 pages.

International Preliminary Examination Report in International Application No. PCT/US01/13732, dated Jul. 12, 2002, 5 pages.

International Search Report in International Application No. PCT/US 01/13723, dated Oct. 31, 2001, 7 pages.

International Search Report in International Application No. PCT/US 01/13725, dated Oct. 31, 2001, 6 pages.

International Search Report in International Application No. PCT/US 01/14624, dated Nov. 6, 2001, 6 pages, Nov 11, 2001.

PCT Invitation to Pay Additional Fees in International Application No. PCT/US 01/13732, dated Nov. 7, 2001, 4 pages.

Tsong–Ho Wu, "A Passive Protected Self–Healing Mesh Network Architecture and Applications," XP000446089, *IEEE/ACM Transactions on Networking*, Feb., 1994, 13 pages.

PCT International Search Report in International Application No. PCT/US 01/13695, dated Oct. 9, 2001, 6 pages.

* cited by examiner

SYSTEM AND METHOD FOR APPLICATION OBJECT TRANSPORT

RELATED APPLICATION

This application claims the benefit of U.S. Provisional Application Serial No. 60/202,190, entitled Internaet Protocol Transport, filed May 5, 2000, which is hereby incorporated by reference.

TECHNICAL FIELD OF THE INVENTION

The present invention relates to the field of communication systems, and more particularly to a system and method for providing traffic engineering services by communicating application objects over a soft state network protocol.

BACKGROUND OF THE INVENTION

Telecommunication networks often implement processes, such as Resource Reservation Protocol (RSVP), which implement soft states while operating. Soft states are memory blocks allocated by processes executing at one or more nodes along the process transmission path, used to track various characteristics of the process and/or the network operation.

The RSVP process has conventionally been used to provide traffic engineering functions, such as ensuring that a particular network application can receive a particular service, such as a given amount of bandwidth without experiencing a specified level of delay. In RSVP operation, a sending application sends a request known as a path signal to a desired destination application. Network elements between the source and destination applications receive the path signal, and create a soft state, typically including the address of the network element that passed the path signal to the current network element.

When the path signal reaches the destination network element, if sufficient network resources are available to satisfy the reservation request, a reservation signal is created and communicated back to the sending application through the same transmission path. Each node receiving the reservation signal creates determines whether sufficient network resources continue to exist and, if so, creates another soft state corresponding to the reservation signal and forwards the reservation signal to the next hop. When the sending network element receives a reservation signal, the reservation request has been confirmed.

To maintain the reservation, RSVP requires that the soft states at each intermediate node periodically be refreshed with additional path and reservation messages. If the soft states are not refreshed, the path breaks down, or is torn down with an explicit path tear message, and the sender must reestablish a new reservation.

Network processes that implement soft states can create problems when networks attempt to implement efficiency algorithms, such as signal aggregation, packet protection, and/or crankback. Signal aggregation typically involves determining that two or more signal flows share a common characteristic, such as passage through common network elements, and transmitting those two signals over all or a part of the network using a common signal trunk (e.g., a collection of signal flows sharing a common signal path). Using conventional aggregation techniques, each network element along the aggregation path is typically aware of the aggregation algorithm and is capable of adding and deleting signal flows from the aggregation trunk. Each node, therefore, commonly tracks information about each signal flow being communicated, requiring storage of vast amounts of information at each node. This problem can be exacerbated when using a process, such as RSVP, that implements soft states. In those cases, each signal flow will require even more information to be stored at each intermediate node, and constant refreshment of that information during operation. Processes using soft states in combination with network efficiency algorithms, such as aggregation, therefore, place heavy loads on the network elements, both in terms of data storage and processing.

In addition, in the particular example of RSVP, typical RSVP processes do not facilitate packet protection, and also do not allow for crankback (finding an alternate path if the reservation, for some reason fails).

SUMMARY OF THE INVENTION

The present invention recognizes a need to facilitate network efficiency algorithms, such as flow aggregation, packet protection, and reservation crankback, for processes using soft states, without placing heavy data storage and processing burdens on each of the network elements. Accordingly, the present invention seeks to reduce or eliminate some of the aforementioned problems identified with other approaches.

In accordance with the present invention, a method of facilitating traffic engineering services by communicating application objects over soft state process messages comprises receiving an external soft state process initiating message at an ingress node to a core cloud, the core cloud comprising a plurality of nodes associated with a central processor, and generating an internal soft state process initiating message including an appended first application object. The method further comprises communicating the internal soft state process initiating message to an egress node of the core cloud, receiving at the ingress node an internal soft state process confirming message including an appended second application object, and providing a traffic engineering service based, at least in part, on the first or second application data.

In a particular embodiment of the invention, with little or no alteration of conventional soft state protocol, the invention facilitates complex traffic engineering functionality that would not otherwise be available using conventional soft state protocols, or that would require significant alterations to the standard soft state protocols and/or additional processing and storage requirements.

Various embodiments of the present invention may exhibit some, none, or all of the following technical advantages. For example, the invention facilitates providing various traffic engineering services while conserving significant system resources. In a particular embodiment, using the information transmitted for the soft state process as a carrier, the invention can communicate application objects between an ingress core node and an egress core node to provide additional functionality, without the need to program intermediate core nodes with the application or to involve those nodes in processing any application data. By piggy backing application protocols over soft state processes executing on some, but not all of the core nodes, and communicating application data transparently over the process data, the particular embodiments of the invention can facilitate significant additional processing of signals used in soft state processes, without requiring substantial additional processing or storage requirements at each node on the signal's path.

As a particular example, conventional RSVP protocol offers no procedure for seeking an alternate traffic flow upon failure of a reservation request. In a particular embodiment of the present invention, failed reservation request on traffic flows within the core cloud can be replaced with alternate traffic flows/traffic trunks. Using information contained in the application objects piggybacked onto standard RSVP state messaging, this aspect of the present invention facilitates features, such as, reservation crankback and packet protection, which are not available in conventional RSVP processes. At the same time, by programming the applications into the ingress and egress nodes of the core cloud, but not all intermediate core nodes, the present invention conserves system resources.

In another embodiment of the present invention, traffic flows can be aggregated onto common traffic trunks within the core cloud, reducing the number of refresh messages passed over the core cloud. The ingress node and egress node can be programmed with algorithms to aggregate traffic flows and deaggregated traffic flows, respectively. When the core cloud receives a refresh path message, or a refresh reservation message associated with a traffic flow on an aggregated path, the invention need only transmit the refresh messages once for all traffic flows on the same aggregated trunk. In this manner, the invention avoids having to store separate state information for each traffic flow at each node, and avoids having to send separate refresh messages for each traffic flow, saving significant system resources.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
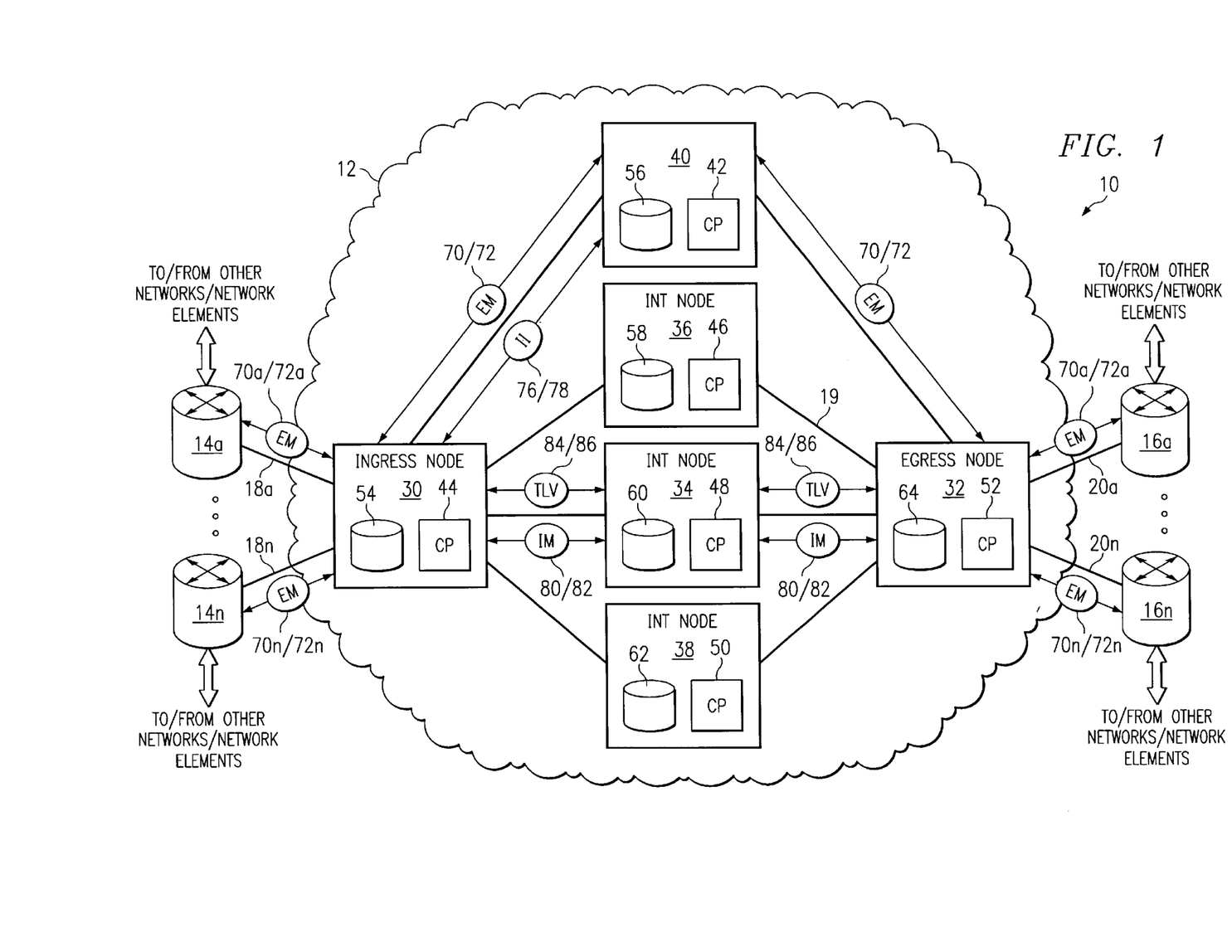
FIG. 1 is a block diagram of an exemplary system operable to provide traffic engineering services through communication of application objects over protocols implementing one or more soft states constructed according to the teachings of the present invention.

FIG. 1 is a block diagram of an exemplary system 10 operable to provide traffic engineering services through communication of application objects over protocols implementing one or more soft states. System 10 includes a core cloud 12 operable to communicate with one or more network elements, such as network elements 14a–14n (referred to generally as network elements 14) and 16a–16n (referred to generally as network element 16).

In the illustrated embodiment, network elements 14 and 16 each comprise routers. Other network elements operable to receive, store, manipulate, and/or communicate information between two or more network elements could be used without departing from the scope of the invention. For example, network elements 14 and 16 could comprise Ethernet switches and/or Frame Relay switches. Network elements 14 and 16 facilitate various routing, switching, and/or processing functions for signals originated or forwarded by other networks (not explicitly shown) or other network elements (not explicitly shown), such as personal computers, servers, switches, routers, or any other network equipment operable to originate and/or forward communication signals.

Network elements 14 and 16 are coupled to core cloud 12 through communication links 18a–18n (referred to generally as communication link 18) and communication links 20a–20n (referred to generally as communication link 20), respectively. Throughout this document, the term "couple" refers to a direct or indirect communication between two or more elements. Elements said to be "coupled" to one another may, but need not, be physically connected. Communication links 18 and 20 may comprise any suitable wireline or wireless system that supports communication between network elements using ground-based and/or space-based components. For example, communication links 18 and 20 may be public switched telephone networks (PSTN), integrated services digital networks (ISDN), local area networks (LAN), metropolitan area networks (MAN), wide area networks (WAN), or other communication systems or combination of communication systems at one or more locations. Each of communication links 18 and 20 may comprise a single network, or multiple separate networks. In addition, although for simplicity each communication link 18 and 20 has been shown as coupled to only one router, it should be understood that communication links 18 and 20 could couple to or include any number of routers, switches, personal computers, servers, or other communication and/or computing devices.

In a particular embodiment, core cloud 12 could comprise a virtual router having a plurality of geographically distributed nodes, or ports 30–40 coupled by communication links 19 and controlled, at least in part, by a central processor. One example of a virtual router is described in co-owned U.S. Patent Application entitled "Transport Network and Method," filed Jun. 6, 2000.

In the illustrated embodiment, communication links 19 coupling core nodes 30–40 comprise fiber or other suitable high-speed links. Other transmission media configured as direct paths or network configurations between core nodes 30–40 could be also be used. Although the illustrated embodiment shows only six nodes, or ports, 30–40, core cloud 12 could comprise any number of nodes or ports.

In the illustrated embodiment, core nodes 30–40 represents a port group, which is treated by external network elements 14–16 as a single entity capable of interacting with external network elements 14–16 and/or other port groups (not explicitly shown) within core cloud 12. In this embodiment, external network elements view each port group of core cloud 12 as a single network element, with internally managed connectivity between port groups. Port groups, such as nodes 30–40 may be defined, for example, as a group of nodes sharing similar routing properties configured to provide point-to-point and/or point-to-multipoint connectivity between each other. Each port group 30–40 may be assigned a unique global IP address for peering and protocol exchanges within and/or external to core cloud 12.

Each of core nodes 30–40 includes a processor 42–52, respectively. In the illustrated embodiment, processors 44–52 comprise local processors operable to control operations within each associated node 30–38. In addition, this example includes a central processor (CP) 42 operable to provide control for port group 30–40. In the illustrated embodiment, processor 42 of node 40 comprises the central processor for port group 30–40. Central processor 42 could, however, reside in any of core nodes 30–40, or in any other location accessible to nodes 30–40.

Each of nodes 30–40 includes, or has access to, a memory 54–64, respectively. Each memory 54–64 may comprise any device or combination of devices operable to facilitate data storage, retrieval, and/or manipulation by one or more processors 42–52. Memories 54–64 may comprise integral parts of core nodes 30–40, or may reside remotely from and be accessible to core nodes 30–40. Although the illustrated embodiment discloses a separate memory 54–64 within each node 30–40, all or a portion of memories 54–64 could alternatively form a central memory residing within or accessible to core cloud 12.

Memory 56 associated with central processor 42 comprises various information regarding the structure and operation of core cloud 12 and its interaction with external networks and external network elements. For example, memory 56 can include various tables storing the network topology of core cloud 12, port groups within core cloud 12, and/or links between core nodes 30–40 and between core nodes 30–40 and external network elements, such as elements 14–16. Throughout this document, the term "table" refers to any data structure, compilation, or arrangement of information operable to facilitate storage, retrieval, and/or manipulation of that information.

In connection with the illustrated embodiment, examples will be described that assume system 10 receives signals from network element 14, which are destined for, or at least pass through, network element 16. In those examples, node 30 serves as an ingress node to core cloud 12 for signals received from network element 14, and node 32 serves as an egress node from cloud 12 for signals bound for network element 16. In those examples, nodes 34, 36, and 38 comprise intermediate nodes (Int. Node) to ingress node 30 and egress node 32. The designations of "ingress," "egress," and "intermediate" nodes to nodes 30–38 are for illustrative purposes only. These designations could change, for example, depending on each node's position within core cloud 12 relative to other nodes in core cloud 12 and network elements external to core cloud 12.

In the illustrated embodiment, each of processors 42–52 executes one or more processes utilizing soft states ("soft state processes"). In addition, ingress node 30 and egress node 32 execute an application protocol on top of the soft state process being executed. This "piggy backed" application runs transparently to the associated soft state process, and some or all of the data it utilizes can be transmitted transparently to the soft state process. Using the information transmitted for the soft state process as a carrier, system 10 can communicate application objects between ingress node 30 and egress node 32 to provide additional functionality within core cloud 12, without the need to program intermediate nodes 34–38 with the application or to involve those nodes in processing any application data.

In operation, ingress node 30 receives an external initiating state message 70 associated with the soft state process from sending network element 14, and forwards external state message 70 to CPU 42 in node 40. CPU 42 communicates external initiating state message 70 to receiving network element 16. CPU receives back from receiving network element 16, an external confirming state message 72. Rather than immediately routing external confirming state message 72 to sending network element 14, CPU 42 generates an internal instruction 76 and routes that instruction to ingress node 30.

Ingress node 30 receives internal instruction 76 and, in response, creates an internal initiating state message 80. Ingress node 30 also creates one or more application objects 84 for use with the piggy-backed application, and appends those application objects 84 to the internal initiating state message 80. Application objects may comprise, for example type length value (TLV) objects.

Ingress node 30 determines or receives from central processor 42 a signal flow associated with internal initiating state message 80 and transmits internal initiating state message 80 and application object 84 toward receiving network element 16. In this example, intermediate node 34 receives internal initiating state message 80 and appended object 84. Intermediate node 34 applies internal initiating state message 80 to the soft state process executing on its processor 48, ignores all or part of application object 84, and transmits signals 80 and 84 to the next hop, in this case egress node 32.

Egress node 32 receives signals 80 and 84, applies internal initiating state message 80 to its soft state process, and applies appended application object 84 to the piggy-back application running on top of the soft state process. From its soft state process, egress node 32 generates an internal confirming state message 82. From its piggy-backed application, egress node 32 generates another application object 86. Egress node 32 communicates internal confirming message 82 and appended application object 86 to intermediate node 34. Intermediate node 34 processes internal confirming state message 82, ignores part or all of application object 86, and passes signals 82 and 86 back to ingress node 30.

Ingress node 30 receives signals 82 and 86, processes those signals, and communicates an internal instruction 78 back to CPU 42. Depending on the content of internal instruction 78, CPU takes an appropriate action with respect to confirming state message 72 received from receiving network element 16.

By piggy backing application protocols over soft state processes executing on some, but not all of core nodes 30–40, and communicating application data transparently over the process data, system 10 facilitates significant additional processing of signals used in soft state processes, without requiring substantial additional processing or storage requirements at each node on the signal's path.

Figure 2:
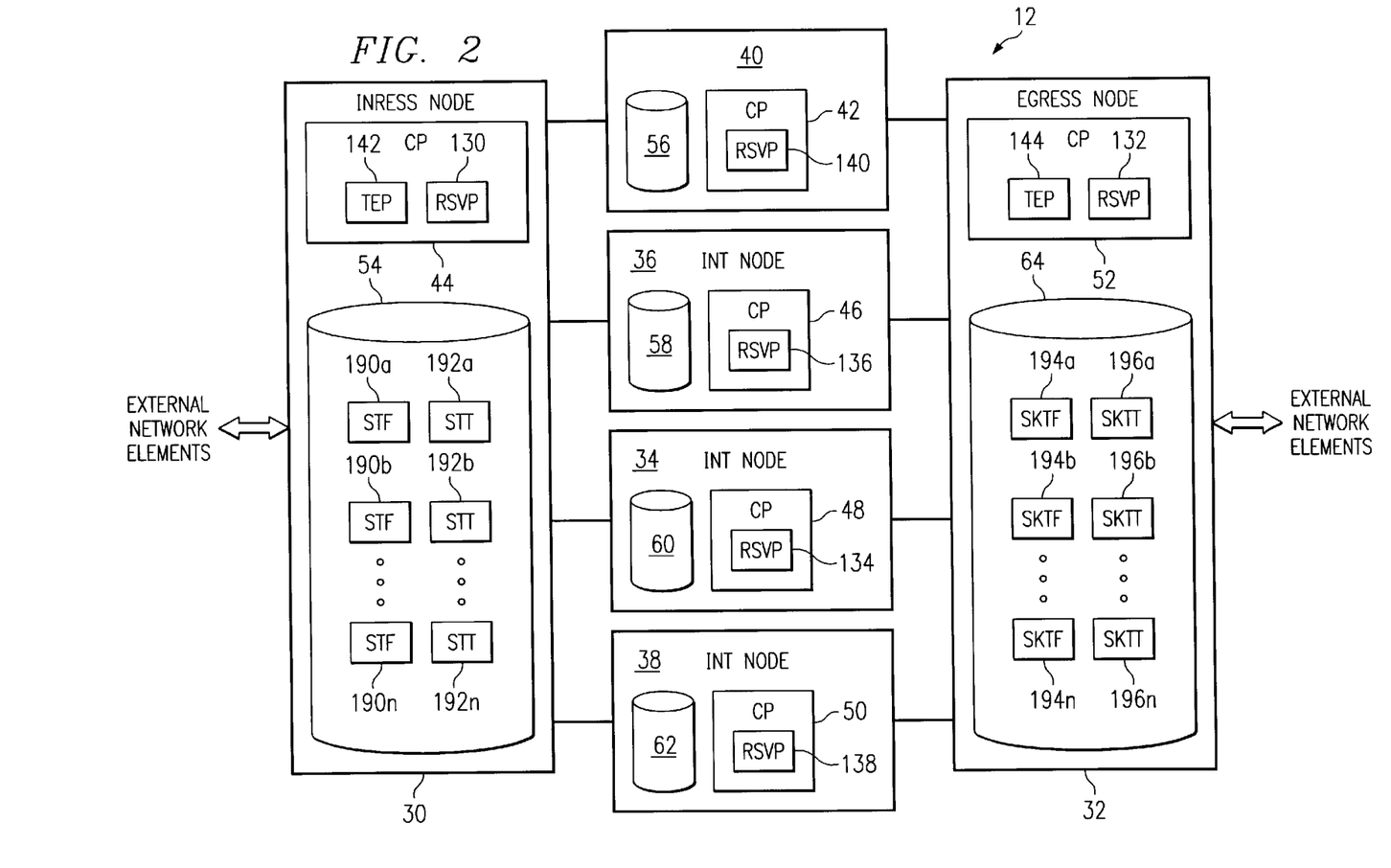
FIG. 2 is a block diagram of an exemplary embodiment of a port group constructed according to the teachings of the present invention.

FIG. 2 is a block diagram of an exemplary embodiment of a port group within core cloud 12. In the illustrated embodiment, the port group comprises core nodes 30–40. In this particular example, each of core nodes 30–40 is executing a Resource Reservation Protocol (RSVP) process 130–140, respectively. RSVP processes 130–140 may comprise, for example, software stored in memories 54–64 and executed on processors 42–52, respectively. Other soft state processes could be implemented without departing from the scope of the invention.

In the illustrated embodiment, ingress node 30 also includes an application protocol 142 "piggy backed" onto RSVP process 130. Similarly, egress node 32 includes an application protocol 144 "piggy backed" onto RSVP process 132. In this example, application protocols 142–144 comprise traffic engineering protocols (TEP) operable to facilitate various traffic engineering functions on signals communicated through core cloud 12. For example, TEPs 142–144 may facilitate packet protection, signal aggregation, reservation crankback, and/or various other traffic engineering functions. TEPs 142 and 144 use RSVP state signals (e.g., "path" and "reservation" signals) communicated between core nodes 30–40 as carriers for application data used in executing TEP's 142–144. Nodes intermediate ingress node 30 and egress node 40 need not be programmed with TEP's and can ignore all or part of the TEP application data appended to the RSVP state signals. With little or no alteration of conventional RSVP protocol, the invention allows system 10 to provide complex traffic engineering functionality that would not otherwise be available using RSVP, or that would require significant alterations to the standard RSVP protocol and/or additional processing and storage requirements.

In the illustrated embodiment, ingress TEP 142 creates source traffic flows (STF) 192a–192n and source traffic trunks (STT) 192a–192m to monitor and control various traffic engineering functions. A traffic flow is a logical connection between nodes. Traffic flows are associated with external RSVP sessions being executed at network elements 14 and/or 16. Source traffic flow objects 190 store state information associated with particular traffic flows and operate to manage various traffic engineering services on that signal. In a particular embodiment, ingress node 30 includes or has access to routing tables or similar information to facilitate explicit specification of an entire signal path between ingress node 30 and egress node 32. In that case, each source traffic flow object 190 represents the entire traffic flow between ingress node 30 and egress node 32, including network addresses for each intermediate node 34 and information regarding links between core network nodes 30–34.

A traffic trunk is the logical signal path associated with an internal RSVP session executed internally to core cloud 12. One or more traffic flows can be associated with each traffic trunk. In the illustrated embodiment, if two or more signal flows exhibit enough common characteristics, those traffic flows can be aggregated onto a single source traffic trunk 192a–192m. For example, traffic flows sharing a common ingress node and a common egress node can be eligible for aggregation onto a common traffic trunk. Other characteristics could be used to identify traffic flows eligible for aggregation, such as the type of traffic being transmitted, the quality of service required, or any other characteristic that can be used to distinguish one traffic flow from another.

Egress TEP 144 executing on egress node 32 may generate sink traffic flows (SKTF) 194a–194n and sink traffic trunks (SKTT) 196a–196n. Sink traffic flows 194 and sink traffic trunks 196 can contain similar information and provide similar functionality to source traffic flows 190 and source traffic trunks 192, respectively.

Ingress TEP 142 also creates a source application TLV object 184 (see FIG. 3a) containing application data to facilitate TEP processing at egress node 32. Similarly, egress TEP 144 creates a sink application TLV object 186 (see FIG. 3b) containing application data to facilitate TEP processing at ingress node 30. In this embodiment, source and sink application objects 184 and 186 are constructed in a protocol data units (PDU) that will be appended to an internal path and reservation messages created by internal RSVP process 130 and 132, respectively.

Figure 3A:
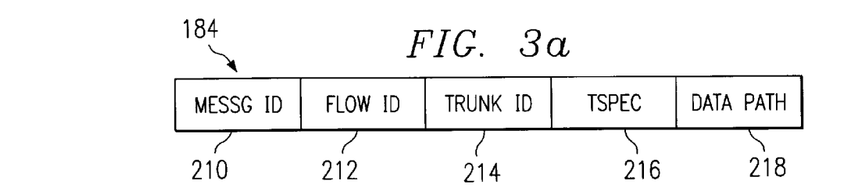
FIGS. 3A–3B are block diagrams of exemplary application objects constructed according to the teachings of the present invention.

FIG. 3a is a block diagram of an exemplary source application object 184. Source application object 184 includes a Message ID object 210 operable to provide an indication of the type of action being suggested by the reservation request. For example, Message ID object 210 may specify creation of a new traffic flow/trunk, deletion of an existing traffic flow/trunk that failed a reservation request, or modification of an existing traffic flow/trunk. Source application object 184 also includes Flow ID object 212 and Trunk ID object 214, which provide an identification of the traffic flow and traffic trunk associated with the current state message. Source application object 184 further includes a traffic specification (TSpec) object 216, which provides information regarding the sending node's traffic engineering requirements. In the illustrated embodiment, source application object 184 also includes a Data Path object 218. Data Path object 218 provides explicit routing information, such as, link information associated with each core node along the traffic flow.

Figure 3B:
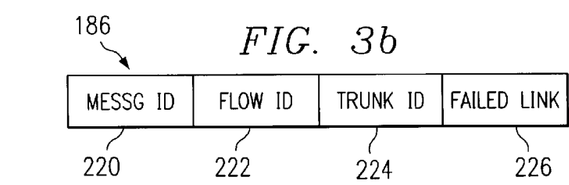

FIG. 3b is a block diagram of an exemplary sink application object 186. Sink application object 186 includes a Message ID object 220 operable to provide an indication of the result of the reservation request. In the illustrated embodiment, this field contains indication of whether the reservation request PASSED or FAILED. Sink application object 184 also includes Flow ID object 222 and Trunk ID object 224, which provide an identification of the traffic flow and traffic trunk associated with the current state message. Sink application object 184 further includes a Failed Link object 226, which provides an identification of the particular link that failed to establish a reservation.

Figure 4A:
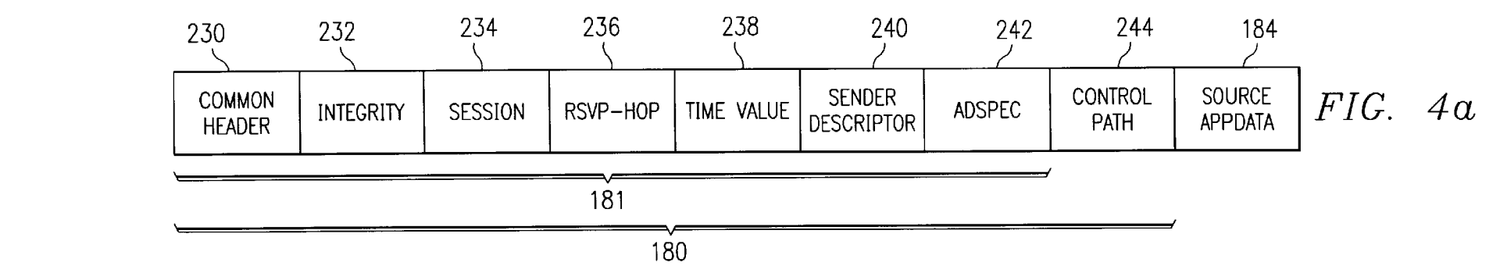
FIGS. 4A–4B are block diagrams of exemplary state messages with appended application objects constructed according to the teachings of the present invention.

FIG. 4a is a block diagram of an exemplary path message 180 with appended source application object 184. Portion 181 of path message 180 comprises a standard RSVP protocol path message including a Common Header object 230, an Integrity object 232, a Session object 234, an RSVP-Hop object 236, a Time-Value object 238, a Sender Descriptor object 240, and an AdSpec object 242. In the illustrated embodiment, path message 180 also includes a Control Path object 244. Control Path object 244 comprises a list of node addresses along the traffic flow path for the associated signal. Control Path object 244 may be useful, for example, in determining the next hop for path signal 180 and appended source application object 184. In this embodiment, source application object 184 is "piggy-backed" onto path message 180.

Figure 4B:
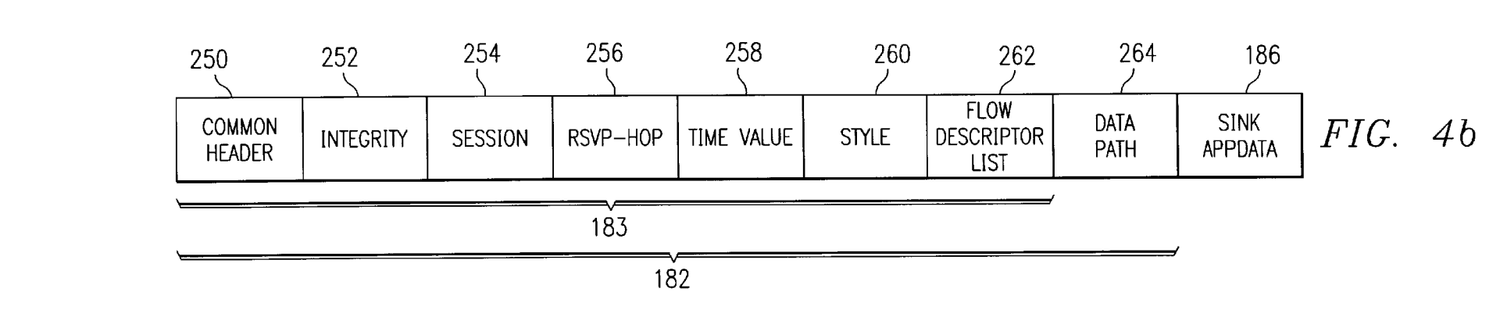

FIG. 4b is a block diagram of an exemplary reservation message 182 with appended sink application object 186. Portion 183 of reservation message 182 comprises a standard RSVP protocol reservation message including a Common Header object 250, an Integrity object 252, a Session object 254, an RSVP-Hop object 256, a Time-Value object 258, a Style object 260, and a Flow Descriptor List object 262. In the illustrated embodiment, reservation message 182 also includes a Data Path object 264. Data Path object 264 comprises link information for each node along the traffic flow path for the associated signal. Data Path object 264 may be useful to internal RSVP processes, for example, in identifying links that need to be analyzed for compliance with the reservation request. In this embodiment, sink application object 186 is "piggy-backed" onto reservation message 182.

The following example assumes that network element 14 desires to transmit a signal to network element 16 with a particular quality of service (Qos) or class of service (Cos) and desires to obtain that quality/class of service using RSVP. In one embodiment, the present invention augments the standard RSVP process to facilitate additional traffic engineering capability. Referring to FIG. 2, in operation, ingress node 30 of core cloud 12 receives an external path message (EPM) 170 from external network 14, and forwards the message to CPU 42 of node 40. External path message 170 comprises a standard RSVP path message requesting a reservation for a particular traffic flow and a particular level of service. Central processor 42 forwards external path message 170 to receiving network element 16 through egress node 32. Central processor 42 may, for example, consult a routing table in memory 56 to determine a path from CPU 42 receiving network element 16.

An external RSVP process operating at receiving network element 16 determines whether sufficient resources exist to meet the requirements of the reservation request. If insufficient resources exist, the external RSVP process at external network element 16, as suggested by standard RSVP protocol, does not respond to the reservation request. Instead, it waits for another path message from a prospective sending network element.

If, on the other hand, sufficient resources exist to satisfy the reservation request, the external RSVP process operating at the receiving network element generates an external reservation message 172, and transmits that message to egress node 32. Egress node 32 receives external reservation message 172 and forwards it to central processor 42. Central Processor 42 temporarily stores external reservation message 172, and communicates to ingress node 30 an instruction 176 to perform RSVP and additional traffic engineering functions within core cloud 12.

In particular, central processor 42 communicates to ingress node 30 a traffic specification (TSpec), a flow specification (Flowspec), and an identification of egress node 32. The traffic specification comprises various information associated with the sending network element's bandwidth/delay requirements.

Upon receiving instruction 176, ingress TEP 142 operating on ingress node 30 uses the identification of egress node 32 to identify one or more traffic flows for a signal's transmission from ingress node 30 to egress node 32. Ingress TEP 142 executing on node 30 creates a source traffic flow object 190 representing the traffic flow between ingress node 30 and egress node 32. Source traffic flow 190 stores soft state information regarding the path message associated with the particular traffic flow.

Ingress TEP 142 also associates source traffic flow object 190 with a source traffic trunk object 192a–192n. In the illustrated embodiment, if two or more signal flows exhibit sufficient common characteristics, those traffic flows can be aggregated onto a single traffic trunk. For example, traffic flows sharing a common ingress node and a common egress node can be eligible for aggregation onto a common traffic trunk. Other characteristics could be used to identify traffic flows eligible for aggregation, such as the type of traffic being transmitted, the quality of service required, or any other characteristic that can be used to distinguish one traffic flow from another.

In a particular embodiment, ingress TEP 142 first checks whether a source traffic trunk already exists, which carries traffic flows having a required common characteristic with the traffic flow sought to be aggregated. If no matching traffic trunk exists, ingress TEP 142 creates a new source traffic trunk object 192. Ingress TEP 142 waits to receive a confirming reservation message to link the current traffic flow object 190 to the newly created traffic trunk object 192.

If, on the other hand, ingress TEP 142 discovers an existing source traffic trunk object 192 carrying traffic flows with sufficient similar characteristics to the current traffic flow, ingress TEP 142 links source traffic flow object 190 with that existing source traffic trunk object 192. The traffic flow will then be aggregated with other traffic flows associated with the same traffic trunk. Ingress TEP 142 uses source traffic flow objects 190 to monitor and process individual traffic flow information, and uses traffic trunk objects 192 to monitor and process aggregate information for aggregated traffic flows.

Ingress TEP 142 generates source application object 184 (see FIG. 3a) containing application data to facilitate TEP processing at egress node 32. Internal RSVP process 130 generates internal path message 180, and appends source application object 184 to path message 180. In this embodiment, Control Path object 244 is also added as an extension to standard RSVP protocol to allow for convenient determination of the next hop for path signal 180 and appended source application object 184. Generation of Control Path Object 244 is especially convenient using a virtual router architecture capable of explicit routing, such as that described with respect to FIG. 2.

Ingress TEP 142 executes transparently to RSVP 130 operating on ingress node 30. As a result, signal flow aggregation can be accomplished without altering the standard RSVP protocol. In addition, intermediate core nodes, such as core node 34, can ignore application data associated with signal aggregation, lessening the data storage and processing burdens on those nodes.

Internal RSVP process 130 communicates internal path message 180 and appended source application object 184 to the next hop according to information stored in Control Path object 244. In this example, the next hop routes path message 180 and appended source application object 184 to intermediate node 34. Intermediate node 34 examines path message 180 and determines, from Control Path object 240 the next hop for that signal. From that information, intermediate core node 34 determines that egress node 32 is the next hop. Intermediate core node 34 creates a path state block, which it stores in memory 60. This path state block will later be used for refresh purposes after establishing a reservation on this path. In this embodiment, intermediate node 34 includes internal RSVP process 134, but no TEP application. As a result, internal node 34 can ignore source application object 186, and simply pass that information to egress node 32.

Egress node 32 receives path message 180 and appended source application object 184, and passes source application object 184 to egress TEP 144. Egress TEP 144 examines source application object 184, and generates sink traffic flow object 194. If this traffic flow has already been aggregated onto an existing traffic trunk, egress TEP 144 will link sink traffic flow 194 to the existing sink traffic trunk 196 carrying the aggregated flows. Otherwise, egress TEP 144 will create a new sink traffic trunk 196, and link that sink traffic trunk 196 with the identified sink traffic flow 194.

Internal RSVP process 132 operating at egress node 32 receives internal path signal 180 and appended source application object 184, and performs an analysis to determine whether sufficient network resources within cloud 12 exists to meet the reservation request. In particular, an admission control module of internal RSVP process 132 examines traffic specification information associated with the reservation request to determine whether the links to egress node 32 specified in data path object 218 have sufficient resources to meet the reservation request. If the reservation request passes, internal RSVP process 132 generates internal reservation message 182. In the illustrated embodiment, internal reservation message 182 includes data path object 264, which can be used by subsequent core nodes in determining whether each link associated with the current node meets the requirements of the reservation requests. Internal RSVP process 132 also appends sink application object 186 to internal reservation message 182. These signals are then communicated back toward ingress node 30 over the same path taken by internal path message 180.

Internal TEP 144 creates path state blocks and reservation state blocks and stores that information in sink traffic flow objects 194 and sink traffic trunk objects 196.

In the illustrated embodiment, internal RSVP process 132 operating on egress node 32 communicates internal reservation message 182 and appended sink application object 186 to intermediate core node 34. Internal RSVP process 132 operating on intermediate core node 34 examines internal reservation message 182 and provides an analysis of whether sufficient system resources exist to satisfy the reservation request. In particular, and admission control module of internal RSVP process 134 uses data path object 218 in reservation message 182 to identify links associated with intermediate node 34, and to analyze whether those links have sufficient resources to satisfy the reservation request. If the reservation request passes, internal RSVP process 134 creates a reservation state block indicating that the path is alive and stores that block in memory 60. In addition, internal RSVP process 134 communicates reservation message 182 and appended sink application object 186 to the next hop, in this case, ingress core node 30. Again, in this embodiment, intermediate node 34 is not programmed with a traffic engineering protocol, and may ignore appended sink application object 186.

Internal RSVP process 130 operating on ingress core node 30 receives reservation message 182 and appended sink application object 186, and passes sink application object 186 to ingress TEP 142. If the reservation request has been satisfied, and if the current traffic flow has not been aggregated onto an existing traffic trunk, ingress TEP 142 links the current source traffic flow 190 with the newly created source traffic trunk 192. Ingress TEP 142 creates soft states in source traffic flow object 190 and source traffic trunk object 192 indicating the status of the reservation request. In a particular embodiment, ingress TEP 142 creates a reservation state block in source traffic flow object 190 and source traffic trunk object 192. The reservation state block in source traffic flow objects 190 indicate the reservation state for each traffic flow. The reservation state block stored in source traffic trunk objects 192 indicate the reservation state of the associated aggregated trunk.

Internal RSVP process 130 receives reservation message 182, and performs an admission control analysis to determine whether the reservation request can be satisfied given the current resources within core cloud 12. If the reservation request passes, internal RSVP process 130 stores an appropriate indication in the reservation state blocks residing in source traffic flow object 190 and source traffic trunk object 192. In addition, internal RSVP process 130 communicates an instruction to central processor 42, informing central processor 42 that the reservation request was satisfied within core cloud 12. If central processor 42 receives an instruction 78 specifying that the reservation request passed, RSVP process 140 passes external reservation message received from destination network element 16 to source network element 14 through ingress node 30. If, however, the instruction from ingress node 30 indicates that the reservation failed somewhere within core cloud 12, RSVP process 140, in accordance with standard RSVP protocol, discards the external reservation message received from destination network element 16.

The present invention facilitates providing packet protection in conjunction with RSVP protocol. As a particular example, after ingress RSVP process 130 identifies a first traffic flow on a first traffic trunk to egress node 32, the above-described process steps can be repeated to establish a protection path between ingress node 30 and egress node 32. Separate source and sink traffic flow objects 190, 194 and traffic trunk objects 192, 196 can be created for primary and protection paths.

In a particular embodiment, system 10 may implement explicit routing procedures to insure that there are no overlapping segments between the primary traffic flow and the protection traffic flow. Alternatively, protection traffic flow and traffic trunks can be selected to ensure no more than a specified level of overlap between protection and primary paths. In an additional embodiment, system 10 may use its knowledge of the topography of core cloud 12 to insure that primary traffic flows and protection traffic flows do not share particular links, which may be associated with high traffic usage or other characteristics making it undesirable for the primary path and the protection path to share that link.

As discussed above, conventional RSVP protocol specifies that path state blocks and reservation state blocks stored at nodes along the signal path must be refreshed periodically to ensure that system resources along the signal path continue to meet the requirements of the reservation request. Likewise, internal path state blocks and reservation state blocks stored, for example, in source traffic flow objects 190, source traffic trunk objects 192, sink traffic flow objects 194, and sink traffic trunk objects 196 periodically need to be refreshed to ensure that the resources of core cloud 12 can meet the requirements of the resource request.

If aggregation were attempted on signals using standard RSVP protocol, each node along the traffic flow would have to be programmed to understand the algorithms for aggregating and deaggregating traffic flows to and from a traffic trunk. Each one of these signals would require path state block and reservation state blocks and associated path refresh messages and reservation refresh messages.

In the present invention, traffic flows can be aggregated onto traffic trunks within core cloud 12, reducing the number of refresh messages passed over core cloud 12. Ingress node 30 and egress node 32 are programmed with algorithms to aggregate traffic flows and deaggregated traffic flows, respectively. When core cloud 12 receives a refresh path message, or a refresh reservation message associated with a traffic flow on an aggregated path, system 10 need only transmit the refresh messages once for all traffic flows on the same aggregated trunk. TEPs 142 and 144 at ingress node 30 and egress 32, respectively, can associate individual traffic flows with the results of the refresh messages received for the aggregated traffic trunk. In this manner, core cloud 12 avoids having to store separate state information for each traffic flow at each node, and avoids having to send separate refresh messages for each traffic flow, saving significant system resources.

In the illustrated embodiment, core cloud 12 refreshes its internal path state blocks and reservation state blocks by processing refresh path messages and refresh reservation messages received from source network element 14 and destination network element 16, respectively. Core cloud 12 treats refresh path messages and refresh reservation messages in essentially the same way that it treated the original path and reservation messages. When ingress core node 30 receives a refresh path message from source network element 14, it forwards that path message to central processor 42 at node 40, which communicates the external refresh path message to destination network element 16 through egress node 32. If destination network element 16 concludes that the reservation request continues to be met, it communicates a refresh reservation message to egress node 32. Egress node 32 communicates the external refresh reservation message to central processor 42.

As with original reservation messages, central processor 42, upon receiving a refresh reservation message from destination network element 16, sends an instruction to ingress node 30 to perform an internal RSVP session and perhaps additional traffic engineering functions. Ingress TEP 142 first checks whether the traffic flow associated with the refresh path message has been aggregated with other traffic flows. If a refresh message has recently been sent over a traffic flow on the same traffic trunk as the current flow, system 10 may choose to forego the current refresh message, and wait for a response on the aggregated trunk.

If no refresh path message for that trunk has been sent, internal RSVP process 130 at ingress node 30 creates a refresh path message and communicates the refresh path message toward egress node 32. Intermediate node 34 receives the refresh path message and communicates the refresh path message to egress node 32. Each node receiving the refresh path message updates its path state block, so that the reservation will not fail due to expiration of the path message.

Internal RSVP process 132 and egress node 32 analyzes the refresh path message to determine whether system resources continue to meet the requirements of the reservation request. If the reservation request passes, internal RSVP process 132 generates a refresh reservation message and updates its reservation state blocks to avoid the reservation failing due to expiration of the time value associated with the reservation message. The refresh reservation message is communicated back over the established traffic flow in traffic trunk toward ingress node 30. At each node, the internal RSVP process at that node performs an analysis of whether the system resources of cloud 12 continue to meet the requirements of the reservation request. Each time the reservation request is satisfied, the RSVP process at the current node updates the reservation state block at that node and communicates the refresh reservation signal to the next node. If the refresh reservation signal passes at ingress node 30, ingress node 30 instructs central processor 42 to forward the external refresh reservation message received from destination network element 16 on to source network element 14.

The foregoing example has assumed, so far, that all reservation requests can be satisfied, and that each network element along the signal path communicates a reservation message indicating a passed reservation state. In some cases, the reservation request will fail, for example, because a refresh path message or a refresh reservation message was not timely received or because insufficient network resources result in a failed reservation request. If the reservation request fails at an external node, standard RSVP protocol specifies that the reservation message should be discarded, and that the sending network element receives no notice of the reservation failure.

In a particular embodiment of the present invention, failed reservation requests occurring within core cloud 12 are treated differently than the procedure specified in the standard RSVP protocol. For example, in a particular embodiment, upon a failure of a reservation request in one of the nodes of core cloud 12, internal RSVP process 132 operating at egress node 32 will communicate a reservation error event upcall to egress TEP 144, specifying, for example, the location of the error and an error code identifying the type of error encountered. In response to the reservation error event upcall, the egress TEP 144 tears down the existing RSVP session and deletes sink traffic flow object 194 associated with the failed traffic flow. In addition, egress TEP 144 creates a sink application object 186 with a message ID object 220 equal to FAIL, and providing an indication of the identity of the Failed Link in failed link object 226.

Unlike standard RSVP protocol, rather than discarding the reservation upon failure of a reservation, internal RSVP process 132 at egress node 32 communicates and empty RSVP signal with appended sink application object 186 toward ingress node 30. Internal RSVP process 134 at internal node 34 may be programmed, for example, to ignore empty reservation messages 182, and to simply transmit those messages and appended sink application objects 186 to the next node. Internal RSVP process 130 at ingress node 30 receives the empty reservation message and passes sink application object 186 to ingress TEP 142. Ingress TEP 142 identifies message ID object 220 in sink application object 186 as specifying a failed reservation request. In response, ingress TEP 142 deletes source traffic flow object 190 associated with the failed reservation request, and triggers a reservation crankback mechanism operable to set up an alternate traffic trunk.

Conventional RSVP protocol offers no procedure for seeking an alternate traffic flow upon failure of a reservation request. In a particular embodiment of the present invention, failed reservation request on traffic flows within core cloud 12 can be replaced with alternate traffic flows/traffic trunks. For example, upon receiving an indication of a failed reservation request, ingress TEP 142 can initiate a process similar to the process for initiating a new traffic flow, and use information in Failed Link object 226 to insure that the new traffic flow avoids the failed link in the original traffic flow and traffic trunk. The reservation crankback mechanism may construct a new traffic flow similar to the original traffic flow avoiding the failed link, or may construct an entirely new traffic flow on a separate traffic trunk.

Using information contained in the application objects piggybacked onto standard RSVP state messaging, the present invention facilitates features, such as, reservation crankback and packet protection, which are not available in conventional RSVP processes. At the same time, by programming the applications into the ingress and egress nodes of core cloud 12, but not intermediate core nodes, the present invention conserves system resources.

Figure 5:
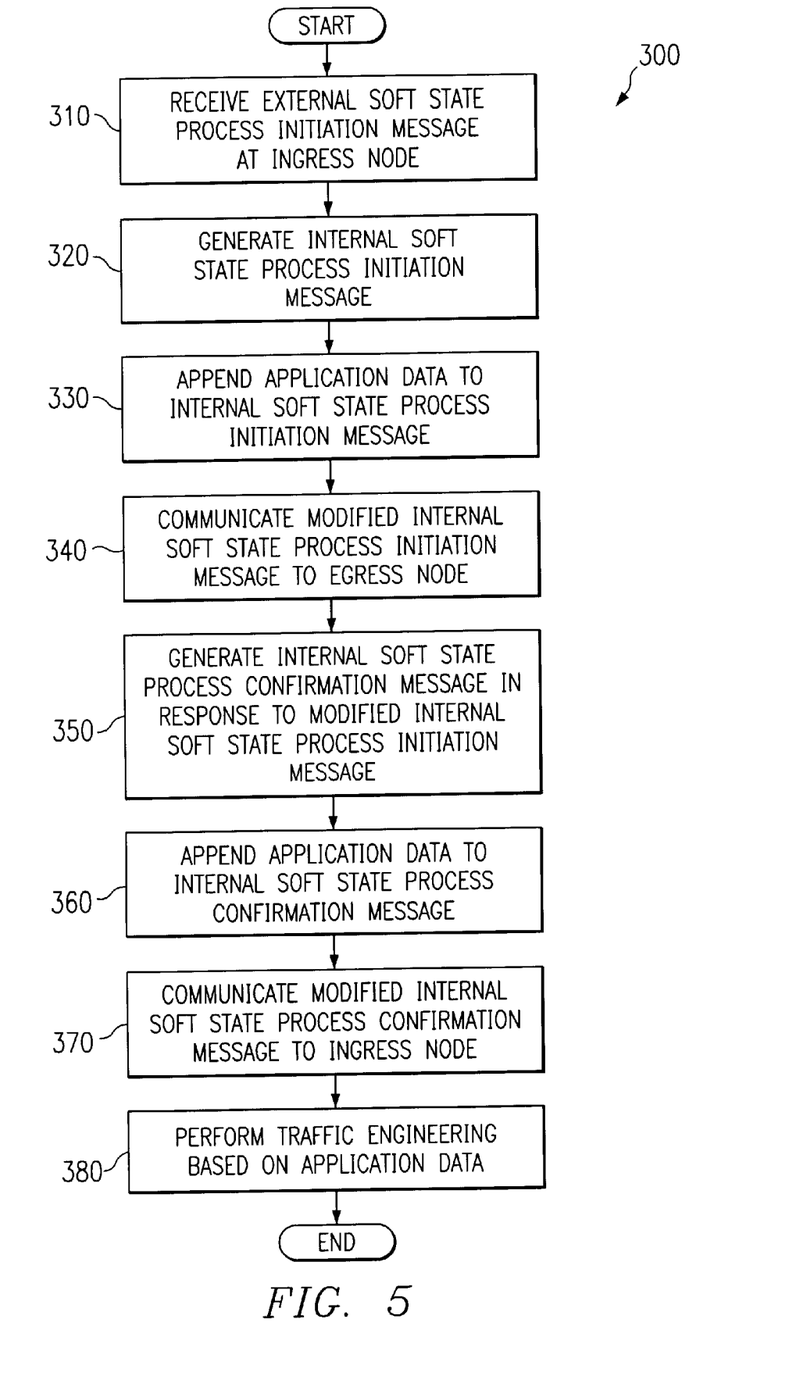
FIG. 5 is a flow chart showing an exemplary method of providing traffic engineering services by communicating application objects over a soft state protocol.

FIG. 6 is a flow chart illustrating an exemplary method 300 of providing traffic engineering services by communicating application objects over a soft state protocol.

Method 300 begins at step 310 where ingress node 20 of core cloud 12 receives external soft state process initiation message 70. In a particular example, the soft state process being executed comprises a Resource Reservation Protocol (RSVP) process and the soft state process initiation message comprises an external path message. In the example shown in FIG. 1, ingress node 30 receives external path message 70 from network element 14, and passes that message to central processor 42 for port group 30–40 of core cloud 12.

Ingress node generates an internal soft state process initiation message at step 320. In the example illustrated in FIG. 2, RSVP process 130 operating at ingress node 30 receives an instruction from central processor 42 to generate internal path message 180. In a particular embodiment, internal path message 180 may comprise a standard RSVP protocol path message with the addition of a control path object 244 to facilitate explicit routing through core cloud 12.

An application protocol process operating over the internal soft state process of ingress node 30 generates and appends application data to the internal soft state process initiation message at step 330. In the example shown in FIG. 2, ingress traffic engineering protocol (TEP) 142 generates source application object 184. Source application object 184 includes a Flow ID object 212 and a Trunk ID object 214 specifying a traffic flow and a traffic trunk, respectively, for internal path message 180. Based, for example, on the address of ingress node 30 and the address of egress node 32, ingress TEP 142 generates source traffic flow object 190 representing a traffic flow from ingress node 30 to egress node 32.

Ingress application TEP 142 may search, for example, memory 54 to identify an existing source traffic trunk object 192 carrying traffic flows with one or more similar characteristics to the traffic flow described by source traffic flow object 190. If a matching source traffic trunk 192 is located, the newly created source traffic flow 190 is linked to source traffic trunk 192 and the traffic flow associated with source traffic flow 190 will be aggregated with other traffic flows associated with source traffic trunk object 192.

Ingress TEP 142 stores soft state information, such as path state blocks in source traffic object 190 and source traffic trunk object 192. These soft states will later need to be refreshed to avoid an expired reservation request. By aggregating multiple traffic flows onto a single traffic trunk, core cloud 12 facilitates refreshing multiple traffic flows using a single refresh message associated with all flows on a particular traffic trunk. In this manner, system 10 avoids the need to track aggregation information on every node within core cloud 12, and greatly reduces the number of refresh state messages processed within core cloud 12.

The internal soft state process operating at egress node 30 transmits a modified internal soft state initiation message toward egress node 32 at step 340. The modified internal soft state process initiation message may comprise, for example, a standard soft state process message with appended application data. In the particular example described in FIG. 2, internal RSVP process 130 communicates path message 180 with appended source application object 184. Source application object 184 may comprise, for example, a TLV object, which is piggybacked onto RSVP path message 180.

In the illustrated example, internal core node 34 receives and forwards on to egress node 32 internal path message 180 with appended source application object 184. In this example, internal core node 34 has not been programmed with a traffic engineering protocol over its internal RSVP process 134. As a result, internal RSVP process 134 examines only internal path message 180, and ignores source application object 184. Internal core node 134 may store a path state block in, for example, memory 60.

Egress node 32 of core network 12 generates an internal soft state process confirmation message at step 350 in response to the modified internal soft state process initiation message received. In the example shown in FIG. 2, internal RSVP process 132 operating at egress node 32 processes internal path message 180, and communicates source application object 184 to egress TEP 144. Egress TEP 144 generates sink traffic flow object 194 and determines whether the current traffic flow has been aggregated onto an existing traffic trunk. If so, egress TEP 144 links the sink traffic flow object 194 to the existing aggregation sink traffic trunk object 196. Otherwise, egress TEP 144 generates a new sink traffic trunk object 196 and links it to the current sink traffic flow 194.

The application running over the internal soft state process at egress node 32 creates an application data object and appends that object to the internal soft state process confirmation message at step 360. In the example discussed in FIG. 2, egress TEP 144 creates sink application object 186, which includes an indication of whether the reservation request passed or failed, as well as identification of any links that failed the reservation request.

In this example, internal RSVP process 132 operating at egress node 32 performs admission control analysis on the reservation request, and generates internal reservation message 182. If the reservation request passed, internal reservation message 182 includes values as shown in FIG. 4B. If, on the other hand, the reservation request failed, internal RSVP process 132 transmits an empty reservation message with appended sink application object 186. In that case, message ID object 220 of sink application object 186 indicates that the reservation request failed, and Failed Link 226 of source application object 186 identifies the link identifier or identifiers associated with the failed request.

The soft state process operating at egress node 32 communicates a modified internal soft state process confirmation message toward ingress node 30 at step 370. In this particular example, internal RSVP process 132 operating at egress node 32 communicates reservation message 182 and appended sink application object 186 toward ingress node 30. Again, if the reservation request passed at egress node 32, reservation message 182 may contain information such as that shown in FIG. 4B. If, on the other hand, the reservation request failed at egress node 32, the reservation message sent will be empty. Other formats or contents of reservation messages may be sent toward the sending node in the event of a reservation failure. The provision of an empty reservation message provides only one example.

In the illustrated example, intermediate core node 34 receives reservation message 182 at appended sink application object 186, processes reservation message 182, and ignores sink application object 186. If internal RSVP process 134 operating at intermediate core node 34 receives an empty reservation message (or other message indicating a failed reservation request, internal RSVP process 134 may simply pass reservation message 182 and appended sink application object 186 to ingress node 30. If, however, internal RSVP process 134 receives a reservation message 182 indicating that the reservation request has passed in all previous nodes, internal RSVP process 134 performs its own analysis of whether the current resources of core cloud 12 satisfy the reservation request. If the reservation request fails, internal RSVP process 134 may pass an empty reservation message 180 to ingress node 30. If the reservation request passes, internal RSVP process 134 may create a path state block and store it in memory 60, and pass reservation message 182 and appended sink application object 186 to ingress node 30.

Ingress node 30 receives the modified internal soft state process confirmation message and performs traffic engineering functions at step 380 based, for example, on application data associated with the application protocol. In this particular example, RSVP process 130 operating at ingress node 30 and ingress TEP 142 may perform traffic engineering functions depending, for example, on the content of reservation request 182 and appended sink application object 186. As a particular example, upon receiving reservation message 182 indicating a passed reservation request, ingress TEP 142 may use information, such as, the identification of the ingress node 30, egress node 32, flow ID object 222 and trunk ID object 224 to create an additional traffic flow to provide packet protection. In one particular example, ingress TEP 142 may use its knowledge of the topography of core cloud 12 and the existing traffic flows and traffic trunks to establish a new traffic flow that has no overlapping links. Alternatively, the new traffic flow can be constructed to have a limited number of overlapping links, or to avoid particular links for various reasons.

As a further example, ingress TEP 142 may perform reservation crankback to generate an alternate traffic flow and/or traffic trunk for an existing traffic flow or traffic trunk experiencing a failed reservation request. For example, ingress TEP 142 may receive sink application object 186 appended to an empty reservation message, including message ID object 220 indicating a failed reservation request, and including failed link object 226 specifying the link or links subject to the reservation request failure. Ingress TEP object 142 may create alternate traffic flows and/or traffic trunks that avoid the failed links. These examples show system 10 providing functionality that would not otherwise be available using a conventional RSVP processes.

As still a further example, system 10 may use aggregation of traffic flows onto traffic trunks to conserve system resources. For example, when soft state processes, such as RSVP, send refresh soft state messages, system 10 can leverage its aggregated traffic trunks to send one or more refresh messages representing some or all of the traffic flows aggregated on that traffic trunk. In this manner, system 10 saves considerable resources, avoiding the need to program intermediate core nodes with aggregation algorithms, and greatly reducing the number of refresh messages processed.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of facilitating traffic engineering services by communicating application objects over soft state process messages, comprising:
   receiving an external soft state process initiating message at an ingress node to a core cloud, the core cloud comprising a plurality of nodes associated with a central processor;
   generating an internal soft state process initiating message including an appended first application object;
   communicating the internal soft state process initiating message to an egress node of the core cloud;
   receiving at the ingress node an internal soft state process confirming message including an appended second application object; and
   providing a traffic engineering service based, at least in part, on the first or second application object.

2. The method of claim 1, wherein generating the internal soft state process initiating message at the ingress node to the core cloud comprises:
   identifying a first traffic flow from the ingress node to the egress node of the core cloud;
   determining whether the traffic flow shares a common characteristic with a second traffic flow associated with an existing first traffic trunk;
   associating the first traffic flow with the first traffic trunk if the first and second traffic flows share a common characteristic.

3. The method of claim 2, wherein the common characteristic between the first and second traffic flows comprises a common ingress node to the core cloud, a common egress node from the core cloud, or a common ingress and a common egress node of the core cloud.

4. The method of claim 1, wherein the internal soft state process initiating message comprises a soft state refresh, and wherein communicating the soft state refresh message to the egress node comprises:
   determining that the traffic flow associated with the soft state refresh message has been aggregated with a second traffic flow on a common traffic trunk; and
   communicating toward the egress node a single soft state refresh message for all traffic flows associated with the aggregated traffic trunk.

5. The method of claim 2, wherein associating the first traffic flow with the second traffic flow comprises:
   creating a first traffic flow software object representing the first traffic flow; and
   linking the first traffic flow software object to a traffic trunk software object representing the first traffic trunk.

6. The method of claim 1, wherein communicating the internal soft state process initiating message to an egress node comprises communicating the internal soft state process initiating message through an intermediate node, and wherein the appended first application object is transparent to the intermediate node.

7. The method of claim 1, wherein the soft state process comprises a Resource Reservation Protocol (RSVP), and wherein the external soft state process initiating message comprises an RSVP path message originated at a network element external to the core cloud.

8. The method of claim 7, wherein generating an internal soft state process initiating message comprises generating an RSVP path message at the ingress node to the core cloud.

9. The method of claim 7, wherein providing a traffic engineering service comprises:
   identifying a primary traffic flow from the ingress node to the egress node; and
   generating a protection traffic flow from the ingress node to the egress node, the primary traffic flow and the protection traffic flow associated with the same RSVP reservation request.

10. The method of claim 9, wherein the protection traffic flow and the primary traffic flow have no overlapping segments.

11. The method of claim 1, wherein the soft state process comprises a Resource Reservation Protocol (RSVP) process and wherein the internal soft state confirming message comprises an RSVP reservation message.

12. The method of claim 11, wherein receiving the RSVP reservation message at the ingress node comprises receiving an RSVP reservation message indicating a failure of a reservation request.

13. The method of claim 12, wherein providing a traffic engineering service comprises identifying an alternate traffic flow for the reservation request.

14. The method of claim 13, wherein the RSVP reservation message or the appended second application object comprises an identification of a link associated with a failed reservation request, and wherein identifying an alternate traffic flow comprises identifying an alternate traffic flow that avoids the link identified with the failed reservation request.

15. A method of facilitating traffic engineering services by communicating application objects over soft state process messages, comprising:

receiving at an egress node of a core cloud an internal soft state process initiating message including an appended first application object, the core cloud comprising a plurality of nodes associated with a central processor;

generating an internal soft state process confirming message including an appended second application object;

communicating the internal soft state process confirming message to an ingress node of the core cloud to facilitate provision of a traffic engineering service based, at least in part, on the first or second application object.

16. The method of claim 15, wherein the internal soft state process initiating message corresponds to a first traffic trunk associated with multiple traffic flows sharing a common characteristic.

17. The method of claim 16, wherein the common characteristic between the multiple traffic flows comprises a common ingress node to the core cloud, a common egress node from the core cloud, or a common ingress and a common egress node of the core cloud.

18. The method of claim 15, wherein the internal soft state process confirming message comprises a soft state refresh, and wherein communicating the soft state refresh message to the ingress node comprises:

determining that the traffic flow associated with the soft state refresh message has been aggregated with a second traffic flow on a common traffic trunk; and communicating to the ingress node a single soft state refresh message for all traffic flows associated with the aggregated traffic trunk.

19. The method of claim 15, wherein communicating the internal soft state process confirming message to the ingress node comprises communicating the internal soft state process confirming message through an intermediate node, and wherein the appended second application object is transparent to the intermediate node.

20. The method of claim 15, wherein the soft state process comprises a Resource Reservation Protocol (RSVP) process and wherein the internal soft state confirming message comprises an RSVP reservation message.

21. The method of claim 20, wherein communicating the RSVP reservation message to the ingress node comprises communicating an RSVP reservation message indicating a failure of a reservation request.

22. The method of claim 21, wherein the traffic engineering service comprises facilitating identification of an alternate traffic flow for the reservation request.

23. The method of claim 22, wherein the RSVP reservation message or the appended second application object comprises an identification of a link associated with a failed reservation request, and wherein the alternate traffic flow avoids the link identified with the failed reservation request.

24. An ingress node of a core cloud operable to facilitate traffic engineering services by communicating application objects over soft state process messages, comprising:

an internal soft state process operable to receive an external soft state process initiating message and to generate an internal soft state process initiating message including an appended first application object, the internal soft state process further operable to communicate the internal soft state process initiating message to an egress node of the core cloud, and to receive an internal soft state process confirming message including an appended second application object; and an application protocol operating over the soft state process, the application protocol operable to generate the first application object, and to provide a traffic engineering service based, at least in part, on the first or second application object.

25. The ingress node of claim 24, wherein the first application object comprises:

an identification of a first traffic flow from the ingress node to the egress node of the core cloud; and an identification of a traffic trunk associated with the first traffic flow; and wherein the traffic trunk is further associated with a second traffic flow having a common characteristic with the first traffic flow.

26. The ingress node of claim 25, wherein the common characteristic between the first and second traffic flows comprises a common ingress node to the core cloud, a common egress node from the core cloud, or a common ingress and a common egress node of the core cloud.

27. The ingress node of claim 24, wherein the internal soft state process initiating message comprises a soft state refresh, and wherein the ingress node is further operable to:

determine that the traffic flow associated with the soft state refresh message has been aggregated with a second traffic flow on a common traffic trunk; and communicate toward the egress node a single soft state refresh message for all traffic flows associated with the aggregated traffic trunk.

28. The ingress node of claim 25, further comprising:

a first traffic flow object representing the first traffic flow; and a traffic trunk object representing a plurality of traffic flows and linked to the first traffic flow object.

29. The ingress node of claim 24, wherein the first application object comprises a type length value object capable of being communicated transparently through a node intermediate the ingress node and the egress node.

30. The ingress node of claim 24, wherein the soft state process comprises a Resource Reservation Protocol (RSVP), and wherein the external soft state process initiating message comprises an RSVP path message originated at a network element external to the core cloud.

31. The ingress node of claim 30, wherein the internal soft state process initiating message comprises an RSVP path message.

32. The ingress node of claim 31, wherein the RSVP path message includes a control path comprising addresses of each node along the traffic flow from the ingress node to the egress node.

33. The ingress node of claim 30, wherein the traffic engineering service comprises creation of a primary traffic flow and a protection traffic flow for the RSVP path message.

34. The ingress node of claim 33, wherein the protection traffic flow and the primary traffic flow have no overlapping segments.

35. The ingress node of claim 24, wherein the soft state process comprises a Resource Reservation Protocol (RSVP) process and wherein the internal soft state confirming message comprises an RSVP reservation message.

36. The ingress node of claim 35, wherein the RSVP reservation message comprises an identification of a failure of a reservation request.

37. The ingress node of claim 36, wherein the traffic engineering service comprises an identification of an alternate traffic flow for the reservation request.

38. The ingress node of claim 37, wherein the RSVP reservation message or the appended second application object comprises an identification of a link associated with a failed reservation request, and wherein the alternate traffic flow comprises a traffic flow that avoids the link identified with the failed reservation request.

39. A system operable to facilitate traffic engineering services by communicating application objects over soft state process messages, comprising:

an ingress node comprising:
an ingress soft state process operable to receive an external soft state process initiating message and to generate an internal soft state process initiating message including an appended first application object, the internal soft state process further operable to communicate the internal soft state process initiating message to an egress node of the core cloud, and to receive an internal soft state process confirming message including an appended second application object; and an ingress application protocol operating over the ingress soft state process, the ingress application protocol operable to generate the first application object, and to provide a traffic engineering service based, at least in part, on the first or second application object;

the egress node comprising:
an egress soft state process operable to receive the internal soft state process initiating message and to generate an internal soft state process confirming message including an appended second application object, the egress soft state process further operable to communicate the internal soft state process confirming message to the ingress node; and an egress application protocol operating over the egress soft state process, the ingress application protocol operable to generate the second application object; and an intermediate node operable to receive and process the internal soft state process initiating and confirming messages, and to ignore the first and second application objects.

* * * * *

UNITED STATES PATENT AND TRADEMARK OFFICE
CERTIFICATE OF CORRECTION

PATENT NO.    : 6,515,966 B1                                                  Page 1 of 1
DATED         : February 4, 2003
INVENTOR(S)   : Snigdho C. Bardalai et al.

It is certified that error appears in the above-identified patent and that said Letters Patent is hereby corrected as shown below:

<u>Column 1,</u>
Line 6, after "entitled" delete "Internaet" and insert -- Internet --.

Signed and Sealed this

Fourteenth Day of October, 2003

JAMES E. ROGAN
*Director of the United States Patent and Trademark Office*